United States Patent
McFarland et al.

(10) Patent No.: US 7,386,647 B2
(45) Date of Patent: Jun. 10, 2008

(54) SYSTEM AND METHOD FOR PROCESSING AN INTERRUPT IN A PROCESSOR SUPPORTING MULTITHREAD EXECUTION

(75) Inventors: Christopher H. McFarland, Round Rock, TX (US); Juan F. Diaz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 11/251,216

(22) Filed: Oct. 14, 2005

(65) Prior Publication Data

US 2007/0088887 A1    Apr. 19, 2007

(51) Int. Cl.
G06F 13/24 (2006.01)
G06F 9/30 (2006.01)
G06F 9/46 (2006.01)
G06F 9/48 (2006.01)

(52) U.S. Cl. .................. 710/260; 710/262; 712/233; 712/244

(58) Field of Classification Search ............... 710/260, 710/262, 263, 266, 268, 269, 48; 712/220, 712/233, 244; 711/132, 147
See application file for complete search history.

(56) References Cited

U.S. PATENT DOCUMENTS

| | | | | |
|---|---|---|---|---|
| 5,218,704 | A * | 6/1993 | Watts et al. | 713/322 |
| 5,220,669 | A | 6/1993 | Baum et al. | 395/775 |
| 6,105,127 | A * | 8/2000 | Kimura et al. | 712/215 |
| 6,263,419 | B1 * | 7/2001 | Boutaud et al. | 712/38 |
| 6,311,264 | B1 * | 10/2001 | Boutaud et al. | 712/38 |
| 6,334,181 | B1 * | 12/2001 | Boutaud et al. | 712/38 |
| 6,363,473 | B1 | 3/2002 | Volentine et al. | 712/202 |
| 6,567,910 | B2 * | 5/2003 | Tessarolo et al. | 712/227 |
| 6,772,240 | B1 | 8/2004 | Chung | 710/33 |
| 6,779,065 | B2 * | 8/2004 | Murty et al. | 710/260 |
| 6,832,301 | B2 | 12/2004 | Bobak et al. | 711/170 |
| 6,848,031 | B2 * | 1/2005 | Jourdan | 711/137 |
| 6,918,025 | B2 * | 7/2005 | Boutaud et al. | 712/33 |
| 6,986,142 | B1 * | 1/2006 | Ehlig et al. | 718/108 |
| 2002/0112144 | A1 * | 8/2002 | Tessarolo et al. | 712/29 |
| 2003/0046464 | A1 * | 3/2003 | Murty et al. | 710/260 |
| 2004/0215939 | A1 * | 10/2004 | Armstrong et al. | 712/220 |
| 2005/0251638 | A1 * | 11/2005 | Boutaud et al. | 711/167 |
| 2005/0278512 | A1 * | 12/2005 | Ehlig et al. | 712/228 |
| 2006/0036889 | A1 * | 2/2006 | Arai | 714/1 |
| 2007/0088887 | A1 * | 4/2007 | McFarland et al. | 710/260 |

OTHER PUBLICATIONS

"New method for dispatching waiting logical processors in virtual machine system" by Umeno et al. (abstract only) Publication Date: Jul. 26-28, 2005.*

* cited by examiner

*Primary Examiner*—Gopal C. Ray
(74) *Attorney, Agent, or Firm*—Baker Botts L.L.P.

(57) ABSTRACT

A system and method is disclosed for the handling of interrupts by the disabled logical processors of an information handling system or computer system. An interrupt service routine is written to the read-only portion of system memory. Upon receipt of an interrupt, each disabled logical processor branches to the hard coded interrupt service routine. The interrupt service routine can be written to read only memory because the context, current instruction, and return state of the disabled logical processor are known, and the disabled logical processor will not need to write to system memory during the execution of the interrupt service routine. Following the handling of the interrupt by another logical processor of the computer system, each disabled logical processor returns to the halt state.

16 Claims, 3 Drawing Sheets

SYSTEM AND METHOD FOR PROCESSING AN INTERRUPT IN A PROCESSOR SUPPORTING MULTITHREAD EXECUTION

TECHNICAL FIELD

The present disclosure relates generally to computer systems and information handling systems, and, more particularly, to a system and method for processing an interrupt in a processor supporting multithread execution.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computer system may include multiple processors, and each of the processors may be subdivided into multiple logical processors. Each of the logical processors may execute in parallel different threads of one or more multithreaded software applications. Each of the logical processors includes a set of dedicated registers. The logical processors also share some hardware resources, including the processor cache. Although some software applications are optimized for multithreaded execution, not all software applications, however, are structured to support multithreaded execution. For the execution of these software applications, one of the logical processors is typically hidden or disabled. When a logical processor is hidden or disabled, the logical processor may be placed in a halt state. Despite being placed in halt state, the disabled logical processors will nevertheless respond to certain interrupts received at the logical processor, requiring each logical processor be allocated a readable and writable space in the real-mode portion of memory for a stack for each logical processor.

SUMMARY

In accordance with the present disclosure, a system and method is disclosed for the handling of interrupts by the disabled logical processors of an information handling system or computer system. An interrupt service routine is written to the read-only portion of system memory. Upon receipt of an interrupt, each disabled logical processor branches to the hard coded interrupt service routine. A common stack for each of the disabled logical processors can be placed read only memory because the context, current instruction, and return state of the disabled logical processor are known. Following the handling of the interrupt by another logical processor of the computer system, each disabled logical processor returns to the halt state.

The system and method disclosed herein is technically advantageous because it provides a technique for placing multiple logical processors in a disabled state, without the necessity of reserving a valid and unique location in the writable portion of memory for each disabled logical processor. The system and method disclosed herein provides a valid location for each disabled processor in read-only memory, thereby avoiding the necessity of creating space on the stack for each disabled processor, while allowing each disabled processor to respond to certain interrupts.

Another technical advantage of the system and method disclosed herein is the system and method disclosed herein allows logical processors to be disabled to better facilitate the execution of software that does not support multithreaded execution. Once one or more of the logical processor are disabled, the software at issue can be executed by a single logical processor in the computer system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
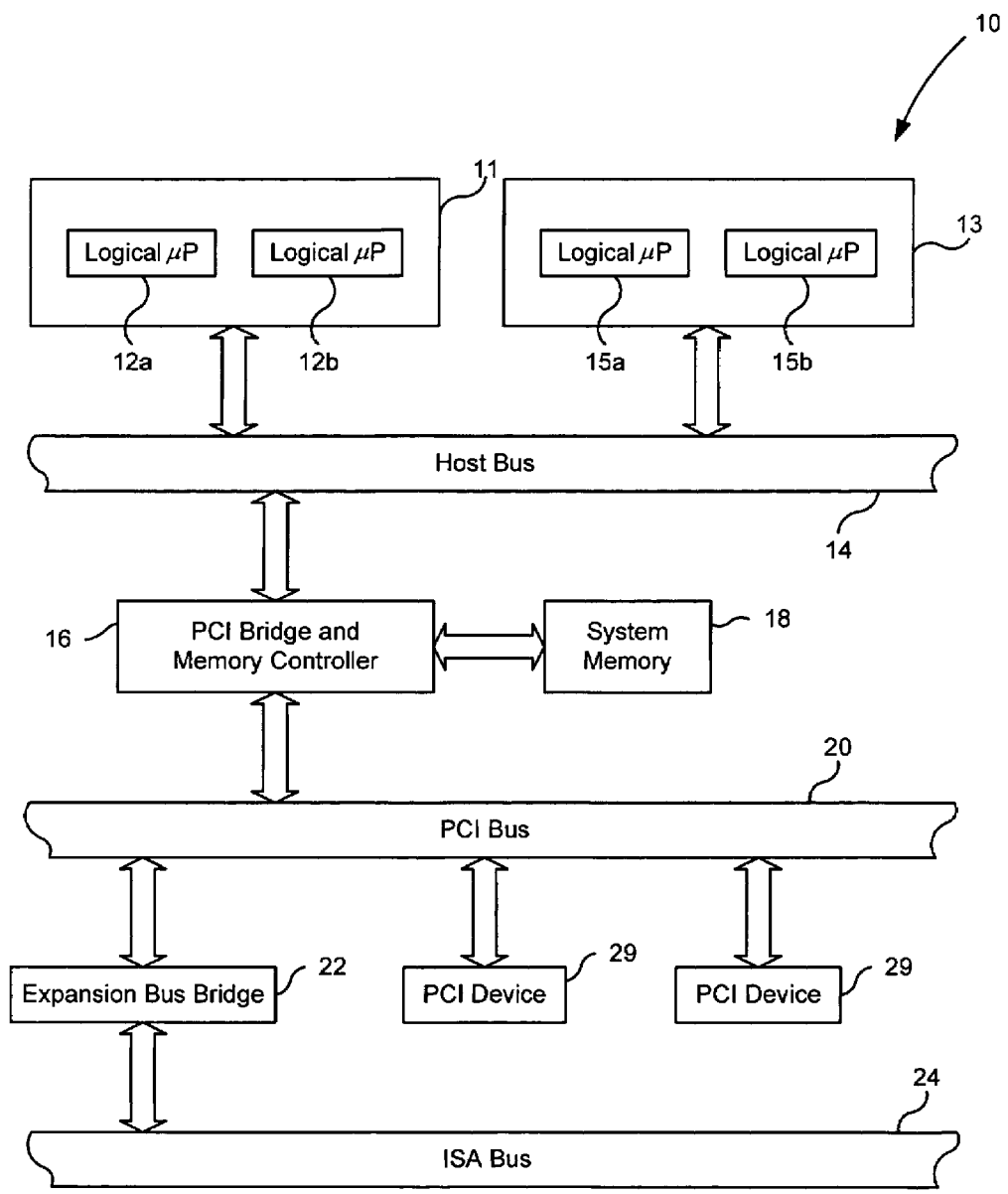
FIG. 1 is a diagram of the architecture of a computer system.

FIG. 1 is a diagram of the architecture of a computer system, which is indicated generally at 10. Computer system 10 is a multiple processor system and, in the example of FIG. 1, includes two processors, identified as processor 11 and processor 12. Each of the processors is coupled to a processor or host bus 14. Coupled to processor bus 14 is a PCI bridge and memory controller 16, which is sometimes referred to as a north bridge. System memory 18 is coupled to north bridge 16. North bridge 16 serves as a communications bridge between the host bus 14 and PCI bus 20. The computer system could have numerous host buses in the computer system, all of which would be coupled to the north bridge of the computer system. In the computer architecture of FIG. 1, PCI devices 29 are coupled to PCI bus 20. In the computer system 10 of FIG. 1, an expansion bus bridge 22 couples PCI bus 20 to an ISA bus 24. As just one alternative to the computer architecture shown in FIG. 1, expansion bus 22 could be coupled to a Super I/O device (not shown). Expansion bus bridge 22 is sometimes referred to as a south bridge. Each processor 12 may include multiple logical processors, which are indicated at 13. In the example of FIG. 1, each processor 12 includes two logical processors. Processor 11 includes logical processor 12a and logical processor 12b, and processor 13 includes logical processor 15a and logical processor 15b.

In operation, it may be necessary to place one or more of the logical processors of a computer system in a halt state such that only a single logical processor of the computer system is not in a halt state and therefore executes the software instructions of the computer system. Alternatively, one logical processor of each processor could be placed in a halt state. Alternatively, the computer system could involve two logical processors and one of those two logical processors could be placed in a halt state. A mode of operation in which less than all of logical processors are enabled or operational may be advantageous when executing a certain code or certain software applications. When operating in this environment, the bootstrap processor is typically not placed in a boot state. After one or more of the logical processors are placed in a halt state, an interrupt may be received by the each logical processor of the computer system. Upon receipt of an interrupt, each logical processor jumps to an interrupt service routine. For those logical processors that have been disabled and placed in a halt state, the disabled logical processors jump to an interrupt service routine that has been hard coded into the read-only portion of the real-mode segment of memory. Because each logical processor jumps from the same processor state and because each processor is executing the same instruction at the time of the interrupt, each halted logical processors jumps to the same interrupt service routine, and each halted logical processor need not write to the stack to complete the interrupt service routine. It should be recognized that not all interrupts will cause the disabled logical processors to branch to an interrupt service routine. In some configurations, the disabled processor will only branch upon receipt of a system management interrupt or a machine check exception.

Figure 2:
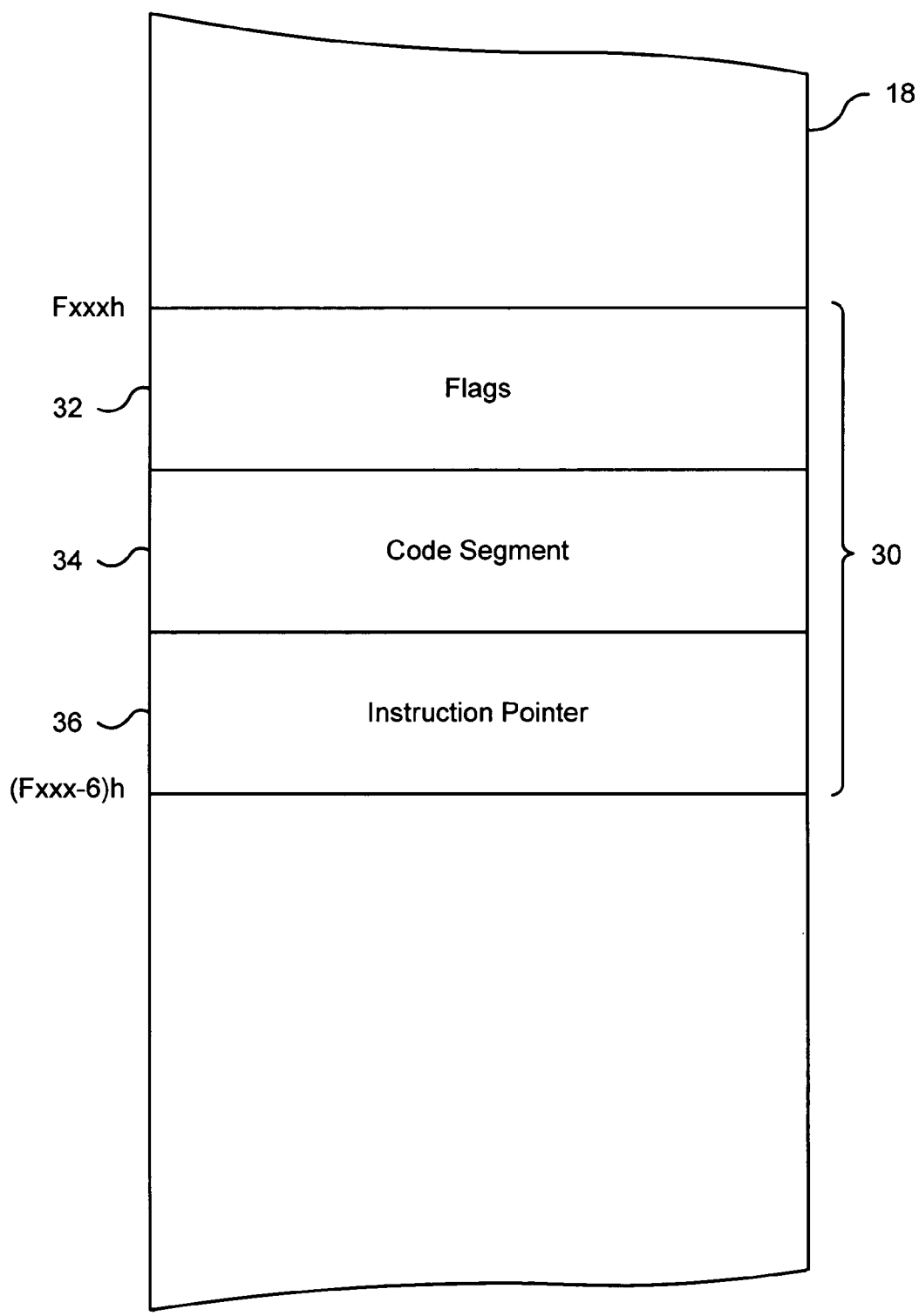
FIG. 2 is a diagram of a hard-coded interrupt service routine in memory.

Shown in FIG. 2 is an example of the hard-coded stack in memory. Because the current state of each halted logical processor is known, the stack can be hard coded and placed in a read-only location in memory and be common to each disabled logical processor. In this example, stack 30 includes three two-byte words, consisting of flags 32, code segment 34, and instruction pointer 36. The flags field 32 includes the flags and other register content of each logical processor. In this environment, because each logical processor is in the same halt state, the content of flags field 32 is the same for each logical processor. Because the content of flags field 32 is known, the content is hard coded into the bytes of the flags segment 32. Code segment 34 includes the address of the current code segment that is being executed by the processor. In this example, because each logical processor that is directed to stack 30 is in a halt state, code segment 34 is the address of the code segment associated with the halt state. Because the code segment of the halt state is known, that address is written to code segment 34. Instruction pointer field 36 is an offset within the code segment. The instruction pointer is a direct pointer to the instruction being executed by the processor at the time that the interrupt was received by the processor. Because each logical processor points to the same halt instruction, the instruction pointer for each logical processor is known. The content of the instruction pointer segment 36 is known and is written or hard coded into the instruction pointer segment 36. Because the completion of the interrupt service routine for each of the disabled logical processors does not depend on writing any data to the memory space of the interrupt service routine, the interrupt service routine and the stack 30 can be written to a read-only portion of system memory. When an interrupt occurs, each of the disabled logical processors jumps to the interrupt service routine while its stack point is pointing to the hard coded stack 30 and completes the interrupt without the necessity of pushing data to the common stack or branching from the interrupt service routine.

Figure 3:
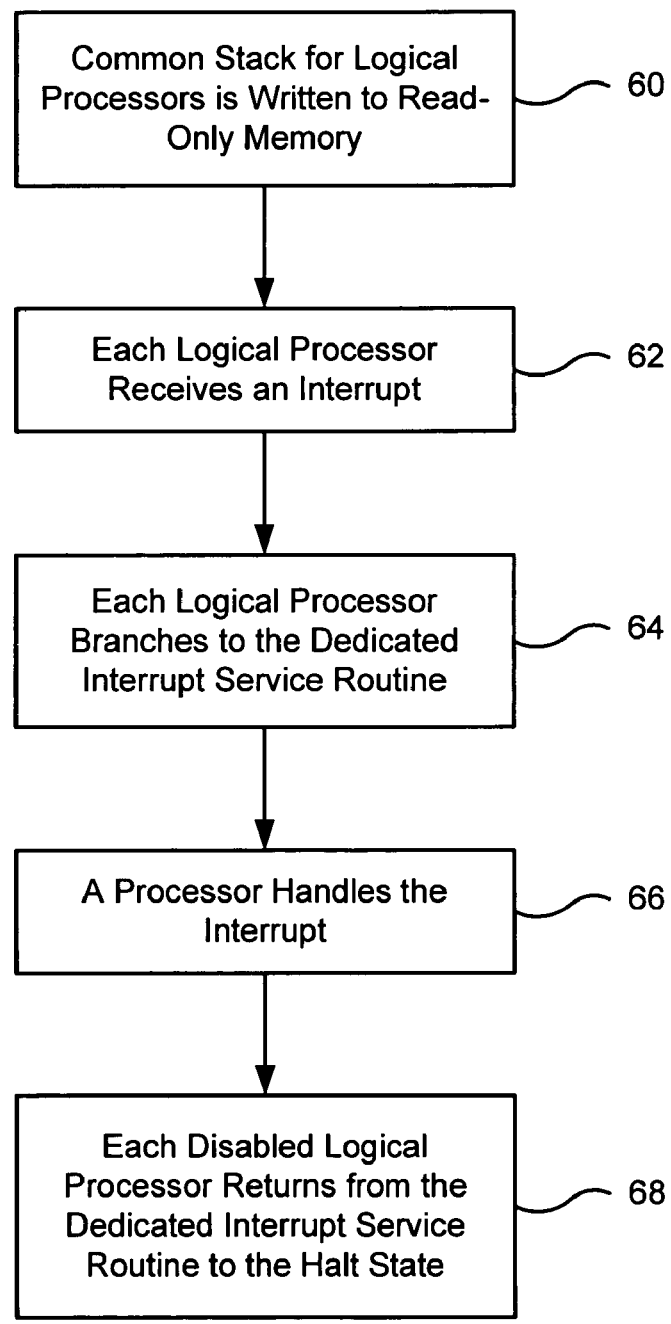
FIG. 3 is a flow diagram of a method for the processing of an interrupt by a disabled logical processor.

Shown in FIG. 3 is a flow diagram of a method for the processing of an interrupt by a disabled logical processor. As an initial matter, at step 60, the stack for each of the disabled logical processors is written to read-only memory in the real-mode space of memory. With reference to the instruction service routine of FIG. 2, the entire content of the common stack hard-coded into read only memory. As described with respect to the common stack of FIG. 2, the common stack can be hard coded into read only memory because the current state, current instruction, and return state of each disabled logical processor is known. During normal operation and before the receipt of any interrupt, each logical processor is placed in a halt state and continually executes a halt instruction. At step 62, each logical processor of the computer system, including the disabled logical processors, receives an interrupt. Following the receipt of the interrupt, each disabled logical processor branches at step 64 to the dedicated interrupt service routine. As part of the branch routine, the disabled logical processor will attempt to push its flags and return address to the hardcoded stack in read only memory. The write to the stack will not take place, however, because the stack is in read only memory. Nevertheless, the data that would have been pushed by the disabled logical processor is already written to the hard coded stack. The disabled logical processor is pointed to the interrupt service routine by a pointer in an interrupt vector table. Each disabled logical processor is pointed to the same interrupt service routine. At step 66, a logical processor other than one of the disabled logical processors handles the interrupt. At step 68, each disabled logical processor returns to the halt state in which the disabled logical processor was in before the disabled logical processor received the interrupt. As part of the disabled logical processor's return from the interrupt state, it is not necessary for the disabled logical processor to retrieve any values from the memory location associated with the interrupt service routine.

It should be recognized that the system and method disclosed herein is not limited in its application to logical processors that share at least some on-chip hardware resources with the other logical processors of the processor. Each logical processor could comprise an independent execution core that shares little, if any, hardware with the other execution core of the processor. It should also be recognized that the system and method disclosed herein is not limited in its application to the system architecture shown in FIG. 1. Rather, the system and method disclosed herein may be used in any system having multiple logical processors. Although the present disclosure has been described in detail, it should be understood that various changes, substitutions, and alterations can be made hereto without departing from the spirit and the scope of the invention as defined by the appended claims.

What is claimed is:

1. A method for handling an interrupt in a disabled logical processor of an information handling system, wherein the system includes multiple logical processors and wherein the disabled logical processor is one of multiple logical processors in a single processor, comprising:
    providing an interrupt service routine in a read-only portion of system memory;
    providing a stack common to each of the disabled logical processors;
    receiving the interrupt request at the disabled logical processor;
    using data at the common stack, executing an instruction at the disabled logical processor to branch instruction flow to the interrupt service routine in the read-only portion of system memory;
    completing the handling of the interrupt, wherein the interrupt is handled by a logical processor other than one of the disabled logical processors within the information handling system; and
    using data at the common stack, returning the disabled logical processor to the state of the disabled logical processor at the time that the disabled logical processor received the interrupt request.

2. The method for handling an interrupt in a disabled logical processor of an information handling system of claim 1, wherein the disabled logical processor is in a halt state before receiving the interrupt request.

3. The method for handling an interrupt in a disabled logical processor of an information handling system of claim 1, wherein the interrupt service routine resides in a real-mode portion of system memory.

4. The method for handling an interrupt in a disabled logical processor of an information handling system of claim 1, wherein the common stack comprises a code segment pointer and an instruction pointer, and wherein the code segment pointer and the instruction pointer point to a halt instruction.

5. The method for handling an interrupt in a disabled logical processor of an information handling system of claim 1, wherein the disabled logical processor is returned to a halt state following the completion of the handling of the interrupt.

6. The method for handling an interrupt in a disabled logical processor of an information handling system of claim 1, wherein the disabled logical processor is in a halt state before receiving the interrupt request and wherein the disabled logical processor is returned to a halt state following the completion of the handling of the interrupt.

7. The method for handling an interrupt in a disabled logical processor of an information handling system of claim 1,
wherein the interrupt service routine resides in a real-mode portion of system memory; and
wherein the common stack comprises a code segment pointer and an instruction pointer, and wherein the code segment pointer and the instruction pointer point to a halt instruction.

8. An information handling system, comprising:
    a first logical processor;
    a second logical processor, wherein the second logical processor is an enabled logical processor; and
    system memory, wherein the system memory includes a stack in a read-only portion of system memory;
    wherein the first logical processor is disabled and is operable to:
        receive an interrupt;
        using data in the stack, execute an instruction to branch instruction flow to the interrupt service routine in the read-only portion of system memory; and
        using data in the stack, return to a halt state following the handling of the interrupt in the information handling system by the second logical processor;
    wherein the stack is common to each of the disabled logical processors of the information handling system, and
    wherein the first logical processor and second logical processor are each one of multiple logical processors in a single processor.

9. The information handling system of claim 8, wherein the interrupt service routine resides in a real-mode portion of system memory.

10. The information handling system of claim 8, wherein the stack comprises a code segment pointer and an instruction pointer, and wherein the code segment pointer and the instruction pointer point to a halt instruction.

11. The information handling system of claim 8,
wherein the interrupt service routine resides in a real-mode portion of system memory; and
wherein the stack comprises a code segment pointer and an instruction pointer, and wherein the code segment pointer and the instruction pointer point to a halt instruction.

12. A method for handling an interrupt in a computer system having multiple logical processors, comprising:
    placing all but one of the logical processors into a halt state;
    providing an interrupt service routine in a read-only portion of system memory;
    providing a stack in a read-only portion of system memory, wherein the stack is common to each logical processor that is in a halt state;
    receiving an interrupt at each logical processor of the computer system;
    using data in the common stack, executing an instruction at each disabled logical processor to branch instruction flow to the interrupt service routine in the read-only portion of system memory; and
    using data in the common stack, returning each disabled logical processor to the halt state following the handling of the interrupt within the computer system by a logical processor other than one of the disabled logical processors.

13. The method for handling an interrupt in a computer system having multiple logical processors of claim 12, wherein the interrupt service routine resides in a real-mode portion of system memory.

14. The method for handling an interrupt in a computer system having multiple logical processors of claim 12, wherein the common stack comprises a code segment pointer and an instruction pointer, and wherein the code segment pointer and the instruction pointer point to a halt instruction.

15. The method for handling an interrupt in a computer system having multiple logical processors of claim 12, wherein each of the multiple logical processors is part of a single processor.

16. The method for handling an interrupt in a computer system having multiple logical processors of claim 15,
- wherein the interrupt service routine resides in a real-mode portion of system memory; and
- wherein the common stack comprises a code segment pointer and an instruction pointer, and wherein the code segment pointer and the instruction pointer point to a halt instruction.

* * * * *